United States Patent Office 3,281,490
Patented Oct. 25, 1966

3,281,490
CATALYST AND ISOMERISATION PROCESS USING SAID CATALYSTS
Anthony George Goble and John Francis Charles Nicholls, Sunbury-on-Thames, England, assignors to The British Petroleum Company Limited, London, England, a joint-stock corporation
No Drawing. Filed Feb. 20, 1963, Ser. No. 260,047
Claims priority, application Great Britain, Mar. 2, 1962, 8,166/62
7 Claims. (Cl. 260—683.2)

This invention relates to a new catalyst and to an isomerisation process using the catalyst.

According to one aspect of this invention there is provided a catalyst consisting of a first metal halide which, per se, is a Friedel-Crafts catalyst and a second metal halide which, per se, may or may not be a Friedel-Crafts catalyst, carried on at catalyst support, the metallic components of the metal halides being different, the halide components of the metal halides being the same or different.

The first metal halide and the second metal halide may form a complex halide.

Preferably the halide components are chloride or bromide.

The preferred Friedel-Crafts catalyst is aluminium chloride. Ferric chloride is another very suitable Friedel-Crafts catalyst including aluminium bromide, ferric chloride and stannic chloride.

Preferably the second metal halide is an alkali metal chloride or bromide, most preferably potassium chloride.

If desired two or more second metal halides may be employed, or the complex halide may contain three or more metallic components.

Preferably the metal halides are used in substantially equimolecular proportions. However, higher proportions of a second metal halide which, per se, is not a Friedel-Crafts catalyst halide than the first metal halide may be used to favour double bond shift.

If desired there may be used the complex halide having the formula $KAlCl_4$.

Suitable supports include activated silica gel, naturally occurring silicates, diatomaceous earths, for example kieselguhr, corondum and silicon carbide. The preferred support is activated silica gel.

Preferred the catalyst consists of from 1 to 50% of total metal halides and from 99 to 50% of support, all percentages being percentages by weight of the total weight of the metal halides and the support.

According to another aspect of this invention there is provided a method of preparing a catalyst which method comprises mixing a molten blend of a first metal halide which, per se, is a Friedel-Crafts catalyst and a second metal halide which, per se, may or may not be Friedel-Crafts catalyst with a catalyst support, the metallic components of the metal halides being different, the halide components of the metal halides being the same or different.

Preferably the blend and support are mixed mechanically, for example, by a stirrer, under an inert blanket, for example nitrogen.

According to another aspect of this invention there is provided a process for the isomerisation of a hydrocarbon which is capable of undergoing skeletal rearrangement and/or double bond shift which comprises contacting the hydrocarbon with a catalyst as hereinbefore described.

The feedstock may be any hydrocarbon capable of undergoing skeletal rearrangement and/or double bond shift. Thus there may be used acyclic or cyclic hydrocarbons, which may be saturated or unsaturated. Preferably the feedstock contains less than 20 carbon atoms/molecule; more particularly it is preferred that the feedstock may contain a mixture of hydrocarbons.

Preferably the process is carried out in vapour phase.

Preferably the process is carried out at elevated temperature most preferably in the range 50°–100° C. In general, using an olefin hydrocarbon, relatively higher temperatures favour skeletal rearrangement and relatively lower temperatures favour double bond shift.

The pressure employed may be sub-atmospheric, atmospheric or super-atmospheric.

By way of illustration, suitable feedstocks include 3, 3-dimethylbutene-1 and 4-methylpentene-1.

Suitably the isomerisation of 4-methylpentene-1 to form 2-methylpentene-2 is carried out at a temperature in the range 150–200° C.

The invention is illustrated but not limited by the following examples:

Example 1

11.9 grams of potassium chloride was added to 22.4 grams of resublimed aluminium chloride; the mixture was heated and gently stirred, without free access to air, to form a homogeneous melt. This was allowed to cool to provide a solidified product.

60 grams of silica gel (70–100 BSS mesh) was calcined by heating for 1 hour at 500° C.

20 grams of the calcined silica gel was reheated to 220° C. and stirred with 21.6 grams of the solidified $KCl/AlCl_3$ product under an atmosphere of nitrogen for 30 minutes. A further 20 grams of the calcined silica gel was introduced into a vertical fluidising tube maintained at 220°–230° C. and blown with dried air at 2.5–3.0 litres/minute. The previously prepared $KCl/AlCl_3$/silica gel mix was added and the whole homogenised for a further 4 hours.

The catalyst so obtained was in the form of a faintly yellow, free-flowing coarse powder.

Example 2

1.4 ml. of the catalyst prepared according to Example 1 was loaded into a small vertical reactor. While maintaining the catalyst at 184° C., 4-methylpentene-1 was passed in downflow in the vapour phase at atmospheric pressure and a liquid hourly space velocity of 0.2 vol./vol./hour.

A sample of the product taken at 7 hours on stream was analysed and found to contain by weight:

| | Percent |
|---|---|
| 2-methylpentene-2 | 49.0. |
| 2-methylpentene-1 | 12.5. |
| Cis/trans-3-methylpentene-2 | 9.1. |
| 4-methylpentene-1 | } 29.4 (by difference) |
| Cis/trans-4-methylpentene-2 | |

Example 3

3.03 gm. of potassium chloride in ground form was added to 5.97 gm. of anhydrous ferric chloride in ground form; the mixture was heated to 250° C. to form a homogeneous melt. The melt became molten at approximately 180° C.

20.6 gm. calcined silica gel (70–100 BSS mesh) was stirred with 7.39 gm. of the melt at 250° C. under nitrogen. A further 20 gm. of the calcined gel was introduced into a vertical fluidising tube maintained at 220°–230° and blown with dried air at 2.5–3.0 litres/minute. The previously prepared $KCl/FeCl_3$ silica gel mix was added and the whole homogenised for a further 4 hours.

We claim:

1. A method of isomerising the double bond of an isomerisable olefinic hydrocarbon containing up to 6 carbon atoms per molecule comprising contacting a catalyst with a vapor consisting of the said isomerisable olefinic hydrocarbon alone or in admixture with one or more isomerisable olefinic hydrocarbons containing up to 6 carbon atoms per molecule, the catalyst consisting essentially of a first metal halide which is a Friedel-Crafts catalyst selected from the group consisting of aluminum chloride, aluminum bromide, ferric chloride and stannic chloride and a second metal halide selected from the group consisting of alkali metal chlorides and bromides, carried on a catalyst support, the reaction conditions being sufficient to promote double bond isomerisation.

2. A process according to claim 1 wherein the hydrocarbon is contacted with the catalyst at a temperature in the range 50° to 500° C.

3. A method of isomerising the double bond of an isomerisable olefinic hydrocarbon containing 6 carbon atoms per molecule comprising contacting a catalyst with a vapor consisting essentially of the said isomerisable olefinic hydrocarbon, the catalyst consisting essentially of a first metal halide which is a Friedel-Crafts catalyst selected from the group consisting of aluminum chloride, aluminum bromide, ferric chloride and stannic chloride and a second metal halide selected from the group consisting of alkali metal chlorides and bromides, carried on a catalyst support, the reaction conditions being sufficient to promote double bond isomerisation.

4. A method as in claim 3, wherein the olefinic hydrocarbon is a methylpentene.

5. A method as in claim 4, wherein the methylpentene is 4-methylpentene-1.

6. A method as in claim 3, wherein the olefinic hydrocarbon is a di-methylbutene.

7. A method as in claim 6, wherein the di-methylbutene is 3,3-dimethylbutene-1.

References Cited by the Examiner

UNITED STATES PATENTS

| | | | |
|---|---|---|---|
| 1,971,167 | 8/1934 | Sumpter | 208—284 |
| 2,040,658 | 5/1936 | Kuentzel et al. | 260—683.15 |
| 2,082,500 | 6/1937 | Kuentzel | 260—683.15 |
| 2,082,519 | 6/1937 | Ruthruff | 260—683.15 |
| 2,082,520 | 6/1937 | Ruthruff et al. | 260—683.15 |
| 2,479,109 | 8/1949 | Haensel | 252—442 |
| 2,820,074 | 1/1958 | Pines | 260—683.2 |
| 2,924,629 | 2/1960 | Donaldson | 260—683.2 |

OTHER REFERENCES

Thomas, C. A.: Anhydrous Aluminum Chloride, Reinhold Publishing Corp., N.Y., 1941, pages 42–47.

DELBERT E. GANTZ, *Primary Examiner.*

R. H. SHUBERT, *Assistant Examiner.*

UNITED STATES PATENT OFFICE
CERTIFICATE OF CORRECTION

Patent No. 3,281,490                      October 25, 1966

Anthony George Goble et al.

It is hereby certified that error appears in the above numbered patent requiring correction and that the said Letters Patent should read as corrected below.

Column 1, line 26, beginning with "The preferred" strike out all to and including "stannic chloride." in line 29, same column 1, and insert instead the following paragraph:

> The preferred Friedel Crafts catalyst is aluminum chloride. Ferric chloride is another very suitable Friedel Crafts catalyst. Other suitable Friedel Crafts catalysts include aluminum bromide, ferric chloride and stannic chloride.

column 2, line 5, for "100" read -- 500 --.

Signed and sealed this 5th day of September 1967.

(SEAL)
Attest:

ERNEST W. SWIDER                      EDWARD J. BRENNER
Attesting Officer                     Commissioner of Patents